(12) United States Patent
Zemenchik

(10) Patent No.: US 9,308,614 B2
(45) Date of Patent: Apr. 12, 2016

(54) BLADE SHARPENING SYSTEM FOR AGRICULTURAL IMPLEMENTS

(75) Inventor: Robert A. Zemenchik, Kenosha, WI (US)

(73) Assignee: CNH Industrial America LLC, New Holland, PA (US)

( * ) Notice: Subject to any disclaimer, the term of this patent is extended or adjusted under 35 U.S.C. 154(b) by 127 days.

(21) Appl. No.: 14/366,585

(22) PCT Filed: Aug. 31, 2012

(86) PCT No.: PCT/US2012/053523
§ 371 (c)(1),
(2), (4) Date: Jun. 18, 2014

(87) PCT Pub. No.: WO2013/033633
PCT Pub. Date: Mar. 7, 2013

(65) Prior Publication Data
US 2014/0349555 A1   Nov. 27, 2014

Related U.S. Application Data

(60) Provisional application No. 61/529,685, filed on Aug. 31, 2011.

(51) Int. Cl.
| | |
|---|---|
| *B24B 41/02* | (2006.01) |
| *B24B 3/46* | (2006.01) |
| *B24B 27/00* | (2006.01) |
| *B24B 47/12* | (2006.01) |
| *A01B 15/16* | (2006.01) |

(52) U.S. Cl.
CPC ............ *B24B 3/466* (2013.01); *A01B 15/16* (2013.01); *B24B 27/0007* (2013.01); *B24B 41/02* (2013.01); *B24B 47/12* (2013.01)

(58) Field of Classification Search
CPC ............ B24B 27/0007; B24B 27/0015; B24B 27/0084; B24B 3/446; B24B 41/02; B24B 47/12; A01B 15/16
USPC ................................................. 451/349, 342
See application file for complete search history.

(56) References Cited

U.S. PATENT DOCUMENTS

| | | | |
|---|---|---|---|
| 1,183 A * | 6/1839 | Tibbits ............... | B24B 27/0015 451/236 |
| 323,344 A | 7/1885 | La Dow | |
| 508,719 A * | 11/1893 | Ingle et al. ............. | B24B 3/466 76/85 |

(Continued)

FOREIGN PATENT DOCUMENTS

FR   2592607 A1 *  7/1987  .......... B24B 27/0015

OTHER PUBLICATIONS

"EdgeCare" Disc Sharpening System; 2010 Ingersoll Tillage Group, Inc.; http://www.ingersolltillage.com/edgecare.html.

(Continued)

*Primary Examiner* — George Nguyen
(74) *Attorney, Agent, or Firm* — Rebecca L. Henkel

(57) ABSTRACT

A blade sharpening system is provided that includes a base, and a rod extending from the base. The blade sharpening system also includes a sharpener slidably coupled to the rod and configured to engage a generally circular blade of an agricultural implement while the generally circular blade is mounted on the agricultural implement. The sharpener is also configured to move along the rod to accommodate lateral variations in a profile of the generally circular blade.

18 Claims, 3 Drawing Sheets

(56) References Cited

U.S. PATENT DOCUMENTS

| | | | |
|---|---|---|---|
| 517,810 A | 4/1894 | Shaw | |
| 548,198 A | 10/1895 | Hoyman | |
| 555,936 A | 3/1896 | Elliott | |
| 603,172 A | 4/1898 | Christopherson | |
| 718,966 A | 1/1903 | Grimm | |
| 872,981 A | 12/1907 | Wissler | |
| 939,115 A | 11/1909 | Ward | |
| 939,713 A | 11/1909 | Klenke | |
| 946,675 A | 1/1910 | Karr et al. | |
| 958,077 A | 5/1910 | Bender | |
| 1,003,340 A | 9/1911 | Combs | |
| 1,044,137 A | 11/1912 | Cassady | |
| 1,069,499 A | 8/1913 | Trone | |
| 1,083,687 A | 1/1914 | Larson | |
| 1,172,763 A | 2/1916 | Bremer | |
| 1,339,043 A | 5/1920 | Schmidt | |
| 1,406,716 A | 2/1922 | Bain | |
| 1,420,568 A | 6/1922 | Nash | |
| 1,479,190 A * | 1/1924 | Lindsay | B24B 3/466 76/85 |
| 1,481,621 A * | 1/1924 | Neuman | B24B 3/466 451/258 |
| 1,738,003 A | 12/1929 | Hill | |
| 1,838,657 A | 12/1931 | Case | |
| 1,826,517 A | 10/1937 | Klockner et al. | |
| 2,185,519 A | 1/1940 | Randall | |
| 2,193,854 A | 3/1940 | Benedict | |
| 2,510,601 A | 6/1950 | Pater | |
| 2,517,950 A | 8/1950 | Weirich | |
| 2,533,009 A | 12/1950 | Harsh | |
| 2,541,829 A * | 2/1951 | Peddicord | A01B 23/06 451/423 |
| 2,565,916 A | 8/1951 | Frusher | |
| 2,597,325 A | 5/1952 | Hodges | |
| 2,873,558 A * | 2/1959 | Olsen | B24B 27/0015 451/236 |
| 2,933,865 A | 4/1960 | Miller | |
| 3,019,568 A * | 2/1962 | Saners | B24B 3/42 451/141 |
| 3,205,623 A | 9/1965 | Clayborne et al. | |
| 3,570,193 A | 3/1971 | Brarrett | |
| 3,694,969 A | 10/1972 | Hahn et al. | |
| 3,823,455 A * | 7/1974 | McIlrath | E01B 31/17 29/33 R |
| 3,833,067 A | 9/1974 | Peterson, Jr. et al. | |
| 4,113,030 A | 9/1978 | Walker | |
| 5,009,039 A * | 4/1991 | Lager | A63C 3/10 451/11 |
| 5,399,125 A * | 3/1995 | Dozier | B24B 21/00 451/303 |
| 5,725,415 A | 3/1998 | Bernhard | |
| 6,223,832 B1 | 5/2001 | Hook et al. | |
| 6,758,730 B1 | 7/2004 | Bernhard | |
| 6,793,567 B1 * | 9/2004 | Corkill | A47L 11/162 451/350 |
| 7,114,413 B1 | 10/2006 | Behan | |
| 7,503,835 B2 | 3/2009 | Cotton | |
| 8,535,120 B2 | 9/2013 | Zemenchik et al. | |
| 8,690,642 B2 * | 4/2014 | Meiners | A01B 15/16 451/349 |
| 2002/0182985 A1 * | 12/2002 | Shiino | B24B 37/04 451/44 |
| 2004/0171337 A1 * | 9/2004 | Eklund | B24B 41/06 451/367 |
| 2006/0225901 A1 * | 10/2006 | Blunier | A01B 23/06 172/558 |
| 2007/0026771 A1 | 2/2007 | Harden et al. | |
| 2008/0029280 A1 * | 2/2008 | Meidinger | A01B 23/06 172/559 |
| 2008/0248732 A1 | 10/2008 | Warrenburg | |
| 2014/0357166 A1 | 12/2014 | Zemenchik et al. | |

OTHER PUBLICATIONS

PCT International Search Report and Written Opinion dated Nov. 29, 2012 for PCT/US2012/053525.

PCT International Preliminary Report on Patentability dated Mar. 13, 2014 for PCT/US2012/053525.

PCT International Search Report and Written Opinion dated Nov. 22, 2012.

PCT International Preliminary Report on Patentability dated Mar. 13, 2014.

* cited by examiner

BLADE SHARPENING SYSTEM FOR AGRICULTURAL IMPLEMENTS

CROSS REFERENCE TO RELATED APPLICATION

This application claims priority from and the benefit of U.S. Provisional Application Ser. No. 61/529,685, entitled "BLADE SHARPENING SYSTEM FOR AGRICULTURAL IMPLEMENTS", filed Aug. 31, 2011, which is hereby incorporated by reference in its entirety.

BACKGROUND

The invention relates generally to ground working equipment, such as agricultural equipment, and more specifically, to a blade sharpening system for agricultural implements.

It is well known that to attain the best agricultural performance from a piece of land, a farmer must cultivate the soil, typically through a tilling operation. Common tilling operations include plowing, harrowing, and sub-soiling. Modern farmers perform these tilling operations by pulling a tilling implement behind a motorized tractor. Depending on the crop selection and the soil conditions, a farmer may need to perform several tilling operations at different times over a crop cycle to properly cultivate the land to suit the crop choice. In one type of tilling operation, rows of blades are pulled through soil to break up clods or lumps of soil, as well as old plant material to provide a more amenable soil structure for planting and to level the soil surface.

As will be appreciated, maintaining a sharp edge on the blades enables the blades to cut plant residue efficiently. Unfortunately, contact with the soil causes the edge of the blades to become dull over time. Therefore, a farmer may periodically (e.g., every few months) sharpen the blades to maintain efficient operation of the tillage implement. Due to the large number of blades on a typical tillage implement, the process of sharpening each blade may be exceedingly time consuming. For example, a farmer may remove each blade from the implement and sharpen the edge of the blade with a handheld grinder. Alternatively, the farmer may utilize a portable blade sharpener having transport wheels. The portable sharpener may be successively rolled into alignment with each blade to sharpen the edge of the respective blade. Certain portable sharpeners include a grinder fixed to a rolling base. In such configurations, the portable sharpener may be positioned such that a grinding disc of the grinder contacts an edge of the blade. The grinder may then be activated as the blade is rotated to facilitate blade sharpening. However, because the position of the grinding disc is fixed with respect to the blade, the portable sharpener may be unable to effectively sharpen fluted or wavy blades.

BRIEF DESCRIPTION

In one embodiment, a blade sharpening system includes a base, and a rod extending from the base. The blade sharpening system also includes a sharpener slidably coupled to the rod and configured to engage a generally circular blade of an agricultural implement while the generally circular blade is mounted on the agricultural implement. The sharpener is also configured to move along the rod to accommodate lateral variations in a profile of the generally circular blade.

In another embodiment, a blade sharpening system includes a base, and a rod extending from the base. The blade sharpening system also includes a sharpener slidably coupled to the rod and configured to engage a generally circular blade of an agricultural implement while the generally circular blade is mounted on the agricultural implement. The sharpener is also configured to move along the rod to accommodate lateral variations in a profile of the generally circular blade. In addition, the blade sharpening system includes a biasing assembly having a weight configured to urge the sharpener along the rod toward the generally circular blade via vertical movement of the weight.

In a further embodiment, a blade sharpening system includes a base, and multiple rods extending from the base. The blade sharpening system also includes a sharpener slidably coupled to the rods and configured to engage a generally circular blade of an agricultural implement while the generally circular blade is mounted on the agricultural implement. The sharpener is also configured to move along the rods to accommodate lateral variations in a profile of the generally circular blade. In addition, the blade sharpening system includes a biasing assembly configured to urge the sharpener along the rods toward the generally circular blade.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
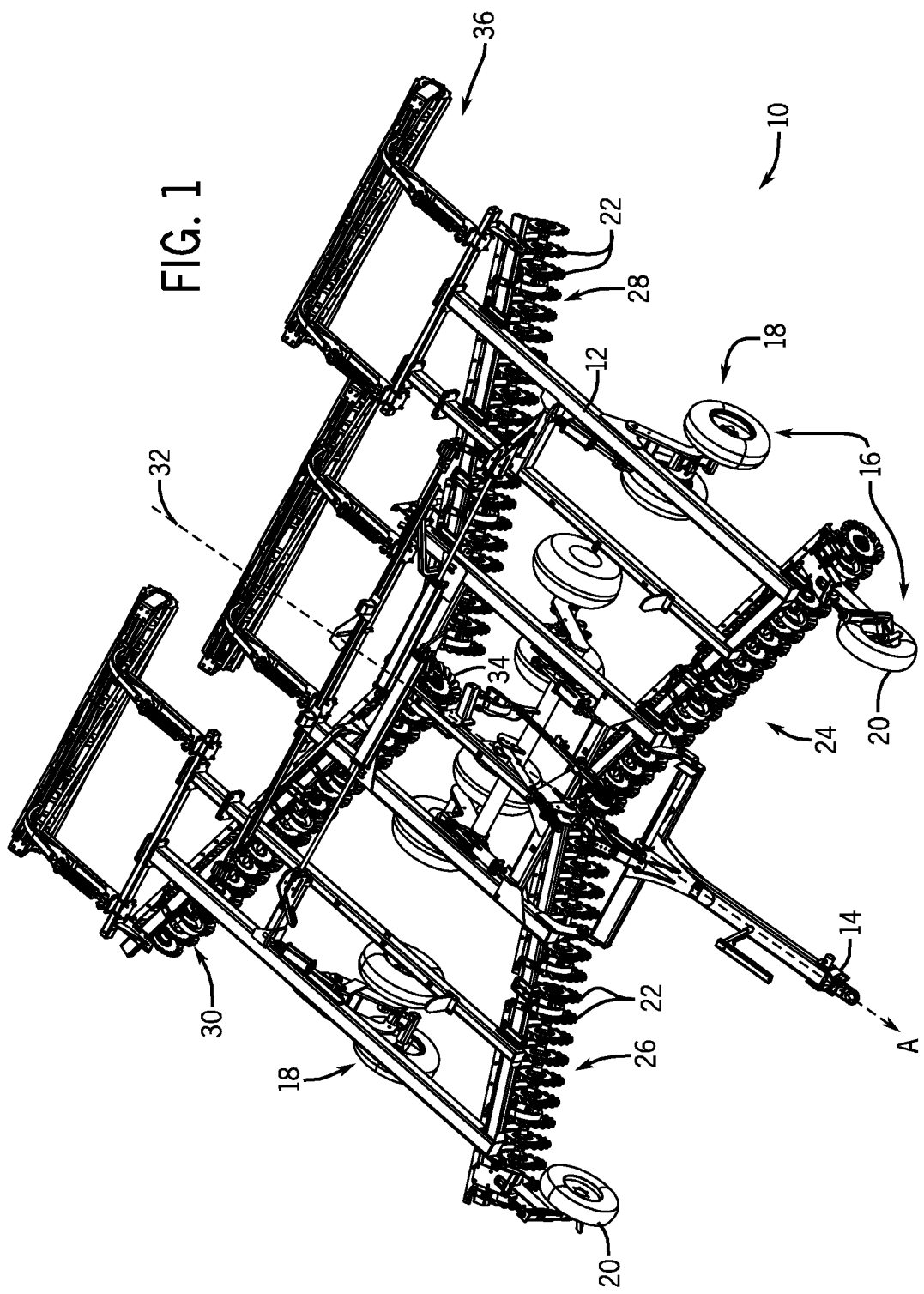
FIG. 1 is a perspective view of an exemplary agricultural implement.

Turning now to the drawings, FIG. 1 is a perspective view of an exemplary agricultural implement 10. While a vertical tilling implement 10 is shown and described below, it should be appreciated that the blade sharpening system may be utilized to sharpen blades on any other suitable agricultural implement. As will be appreciated, an agricultural vehicle is configured to pull the vertical tilling implement 10 in a direction of motion A. The vertical tilling implement 10 includes a main frame 12. The main frame 12 has a hitch 14 on the front end that may be used to connect the vertical tilling implement 10 to the agricultural vehicle, such as a tractor or other prime mover. Additionally, a set of wheels 16 is connected to the main frame 12. The set of wheels 16 is oriented in a direction that is in general alignment with the direction of motion A. The set of wheels 16 includes a set of center wheels 18 and a set of pivoting wheels 20. The set of center wheels 18 is attached across the main frame 12 at positions, for example, roughly midway between the front and rear ends of the main frame 12. The set of center wheels 18 may include a system for adjusting the distance between the main frame 12 and the set of center wheels 18. This system for adjusting may permit the set of center wheels 18 to be statically fixed during the movement of the vertical tilling implement 10 or to be dynamically adjustable as the vertical tilling implement 10 travels. The set of pivoting wheels 20 is connected to the front distal ends of the main frame 12, and may reduce the amount of lateral and/or vertical movement of the vertical tilling implement 10 as it is pulled.

The vertical tilling implement 10 also includes multiple rows of fluted-concave blades 22 attached to the main frame 12. In certain configurations, the rows of fluted-concave blades 22 are indexed. In particular, the rows of fluted-concave blades 22 include a front left row 24, a front right row 26, a rear left row 28, and a rear right row 30. When indexed, the front left row 24 and the front right row 26 are aligned with the rear left row 28 and the rear right row 30 such that areas of ground between the blades in the front left row 24 and the front right row 26 are engaged by the blades in the rear left row 28 and the rear right row 30 as the tilling implement is pulled forward.

In the illustrated embodiment, the front left row 24 is symmetric about a centerline 32 of the vertical tilling implement 10 with the front right row 26. Likewise, the rear left row 28 is symmetric about the centerline 32 of the vertical tilling implement 10 with the rear right row 30. Additionally, the front left row 24 is substantially symmetric about a line perpendicular to the direction of motion A with the rear left row 28. Likewise, the front right row 26 is substantially symmetric about a line perpendicular to the direction of motion A with the rear right row 30. These general symmetries may involve some of the rows being offset relative to the others to achieve the indexing of the blades as described above.

When the rows of concave blades 22 are arranged in a symmetrical arrangement about the centerline 32, such as illustrated in FIG. 1, a gap between each side of the symmetrical rows may be created. A center tilling member 34 may be placed in this gap to ensure that all the soil passing under the vertical tilling implement 10 is tilled as the tilling implement is pulled forward. The center tilling member 34 may be a coulter, as shown in FIG. 1, another fluted blade, or the like.

While four rows of fluted-concave blades 22 are employed in the illustrated embodiment, it should be appreciated that more or fewer rows may be utilized in alternative embodiments. Additionally, while the illustrated embodiment shows the rows of fluted-concave blades 22 having an x-shaped configuration based on the described symmetry, the rows of fluted-concave blades 22 may have a different configuration. For example, the rows of fluted-concave blades 22 may have a diamond configuration, a k-shaped configuration, or all may be parallel with each other in a direction perpendicular to the direction of motion A. Furthermore, it is contemplated that some or all of the rows may be configured in asymmetric arrangements.

Rolling basket assemblies 36 are connected to the rear end of the main frame 12 to provide downward pressure. As will be appreciated, the rolling basket assemblies 36 may be replaced with any other acceptable member that is capable of exerting a desired downward pressure, including drag harrows, and the like. Although FIG. 1 shows three rolling basket assemblies 36, two of which having rotational axes which are not collinear with the third, the rolling basket assemblies 36 may include fewer or more members providing downward force.

As discussed in detail below, a blade sharpening system may be employed to sharpen the edges of the fluted-concave blades 22, thereby maintaining efficient operation of the implement 10. As will be appreciated, maintaining a sharp edge on the blades 22 enables the blades 22 to cut plant residue efficiently. Consequently, it may be desirable to periodically (e.g., every few months) sharpen each blade 22 on the implement 10. The blade sharpening system described below includes a base, and a rod extending from the base. The blade sharpening system also includes a sharpener slidably coupled to the rod and configured to engage a fluted-concave blade 22 of the implement 10. The sharpener is configured to move along the rod to accommodate lateral variations in a profile of the blade 22. Consequently, the blade sharpening system may provide a substantially uniform blade edge despite lateral variations in the blade profile.

While the implement 10 shown and described below utilizes generally circular fluted-concave blades, it should be appreciated that alternative implements may employ other blade configurations. For example, certain implements may include fluted blades having no concavity (i.e., substantially flat). Alternative implements may include smooth-edged concave blades, i.e., blades having no flutes. Yet further implements may employ wavy blades, flat blades, or other blade configurations. In addition, certain implements may utilize a combination of blades. Because certain embodiments of the blade sharpening system are configured to accommodate lateral variations in blade profile, the blade sharpening system may be utilized to sharpen any of the blade configurations described above, or other suitable blade configurations.

Figure 2:
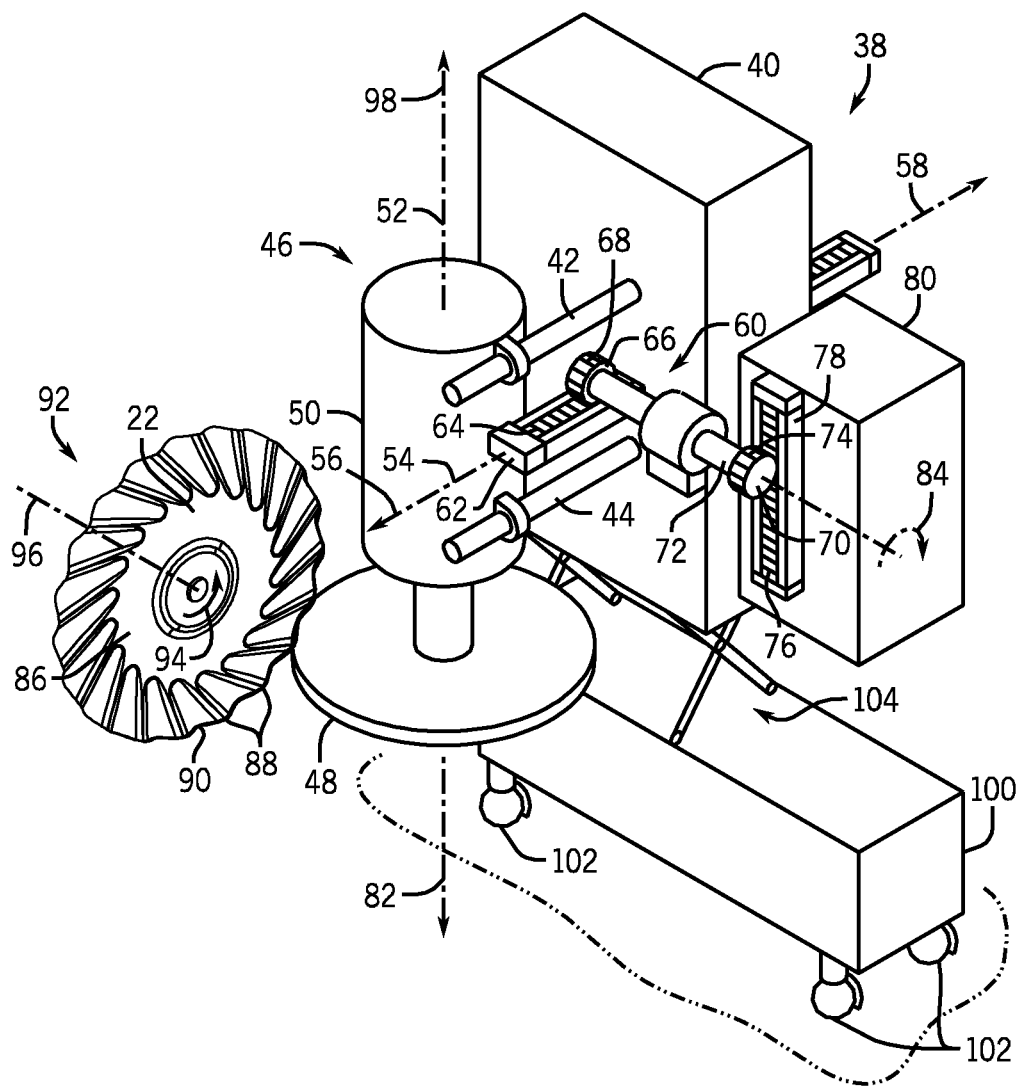
FIG. 2 is a perspective view of an embodiment of a blade sharpening system that may be employed to sharpen blades of the agricultural implement.

FIG. 2 is a perspective view of an embodiment of a blade sharpening system 38 that may be employed to sharpen blades 22 of the agricultural implement 10. As illustrated, the blade sharpening system 38 includes a base 40, a first rod 42 extending from the base 40, and a second rod 44 extending from the base 40. The blade sharpening system 38 also includes a sharpener 46 slidably coupled to the rods 42 and 44, and configured to engage a blade 22 of the agricultural implement 10. In the illustrated embodiment, the sharpener 46 includes a grinding disc 48 configured to sharpen an edge of the blade 22, and a motor 50 configured to drive the grinding disc 48 to rotate. As will be appreciated, contact between the rotating grinding disc 48 and the blade 22 removes a small amount of material from the edge of the blade 22, thereby increasing blade sharpness. As a result, the illustrated blade sharpening system 38 may provide a substantially uniform blade edge, thereby enhancing the residue cutting effectiveness of the blade 22.

In the illustrated embodiment, the motor 50 is mounted in a substantially vertical orientation (i.e., parallel to the vertical axis 52), and the grinding disc 48 is mounted in a substantially horizontal orientation. Consequently, the grinding disc 48 rotates in a plane substantially perpendicular to the rotational plane of the fluted-concave blade 22. However, it should be appreciated that the motor 50 and/or the grinding disc 48 may be mounted in other orientations in alternative embodiments. For example, in certain embodiments, the motor 50 may be angled relative to the vertical axis 52, thereby varying an angle between the rotational plane of the grinding disc 48 and the rotational plane of the blade 22. In addition, the grinding disc 48 may be coupled to the motor 50 by a bent shaft, thereby varying an angle of the grinding disc 48 relative to the blade 22.

In the illustrated embodiment, the sharpener 46 is configured to traverse the rods 42 and 44 along an axis 54 to accommodate lateral variations in a profile of the fluted-concave blade 22. For example, variations in the blade profile may drive the sharpener 46 toward the blade 22 in a direction 56 and/or away from the blade 22 in a direction 58. To maintain contact between the grinding disc 48 and the blade 22, the illustrated blade sharpening system 38 includes a biasing assembly 60 configured to urge the sharpener 46 toward the blade 22. Consequently, a contact force between the grinding disc 48 and the blade 22 may be maintained despite variations in the blade provide. As a result, the blade sharpening system 38 may provide a substantially uniform blade edge.

In the illustrated embodiment, the biasing assembly 60 includes a first gear rack 62 coupled to the sharpener 46, and including a set of teeth 64. The biasing assembly 60 also includes a first pinion gear 66 having a corresponding set of teeth 68 configured to engage the teeth 64 of the first gear rack 62. Furthermore, the first pinion gear 66 is coupled to a second pinion gear 70 via a shaft 72. The second pinion gear 70 includes a set of teeth 74 configured to engage corresponding teeth 76 of a second gear rack 78. In this configuration, a weight 80 of the second gear rack 78 urges the gear rack 78 in a downward direction 82 along the vertical axis 52, thereby urging the second pinion gear 70 to rotate in a direction 84. Due to the coupling between the second pinion gear 70 and the first pinion gear 66, the first pinion gear 66 is urged to rotate in the direction 84, thereby urging the first gear rack 62 to move in the direction 56. Consequently, the weight 80 of the second gear rack 78 urges the sharpener 46 toward the blade 22 via rotation of the first and second pinion gears.

As previously discussed, the implement 10 includes fluted-concave blades 22. As illustrated, each blade 22 includes a flat center portion 86 and a series of crests 88 and troughs 90 extending a-radially inward from the outer periphery of the blade 22. The series of crests 88 and troughs 90 forms multiple flutes 92. As will be appreciated, employing fluted-concave blades 22 may permit the use of more aggressive gang angles without resulting in increased blade failures or the generation of large clumps of soil requiring multiple passes, and/or may enable the implement 10 to travel at greater speeds than the known tilling systems having freely-rotatable blades. Unfortunately, blade sharpening systems employing fixed sharpeners may be unable to follow the contours of the fluted blades 22, thereby resulting in an uneven edge that is less effective for cutting plant residue. Consequently, the illustrated blade sharpening system 38 is configured to accommodate lateral variations in blade profile, thereby enabling the blade sharpening system 38 to be utilized for sharpening fluted-concave blades 22, or other suitable blade configurations. While a single blade 22 is shown, it should be appreciated that the blade sharpening system 38 is configured to sharpen each blade 22 of the implement 10 while the blades 22 are mounted on the implement 10.

To sharpen the blade 22, the grinding disc 48 is placed into contact with a blade 22 on the agricultural implement 10, and the sharpener 46 is activated, thereby inducing the grinding disc 48 to rotate. The blade 22 in then rotated in the direction 94 about an axis of rotation 96 (or in an opposite direction about the axis 96). For example, in certain embodiments, the blades 22 of the implement 10 are arranged in gangs that may form part of a row (e.g., 24, 26, 28, or 30). The blades 22 within the gang are keyed to an axle, thereby inducing the blades 22 to rotate together. In such embodiments, a drive unit may be coupled to one of the blades within the gang, or to the gang axle, thereby inducing each blade 22 within the gang to rotate in the direction 94. In certain embodiments, operation of the sharpener 46 may be coordinated with operation of the drive unit such that the blade 22 is driven to rotate as the grinding disc 48 sharpens the edge of the blade 22.

During the sharpening process, the weight 80 of the second gear rack 78 urges the pinion gears 66 and 70 to rotate, thereby urging the sharpener 46 toward the blade 22. Consequently, when the grinding disc 48 encounters a trough 90, the sharpener 46 moves in the direction 56 to accommodate the blade profile variation. Conversely, when the grinding disc 48 encounters a crest 88, the sharpener 46 moves in the direction 58 (i.e., away from the blade 22), thereby driving the weight 80 in an upward direction 98. In this manner, the illustrated blade sharpening system 38 may accommodate lateral variations in the blade profile, thereby providing a substantially uniform blade edge. As will be appreciated, the mass of the weight 80 may be particularly selected to establish the desired contact force between the grinding disc 48 and the blade 22. For example, a heavier weight may be utilized to increase the contact force, and a lighter weight may be utilized to decrease the contact force.

In the illustrated embodiment, the blade sharpening system 38 includes a movable platform 100 configured to facilitate movement of the sharpener 46 relative to the implement 10. For example, during the blade sharpening process, wheels 102 of the movable platform 100 may be locked, thereby maintaining a position of the blade sharpening system 38 relative to the blade 22. After the sharpening process is complete, the wheels 102 may be unlocked, and the blade sharpening system 38 may be moved to a subsequent blade. In this manner, each blade 22 of the implement 10 may be sharpened without removing the blades 22 from the implement 10. Furthermore, the blade sharpening system 38 includes a height adjustment assembly 104 extending between the movable platform 100 and the base 40. The height adjustment assembly 104 is configured to adjust a height of the sharpener 46, thereby enabling the blade sharpening assembly 38 to accommodate a variety of blade heights (e.g., relative to the ground, relative to the frame of the implement, etc.).

While the illustrated embodiment employs gear racks and pinion gears to urge the sharpener 46 toward the blade 22, it should be appreciated that alternative embodiments may utilize other assemblies to transfer the downward force of the weight 80 to the sharpener 46. For example, in certain embodiments, the blade sharpening system may utilize a cable/pulley system to urge the sharpener toward the blade via a downward force of a weight. In further embodiments, the blade sharpening system may utilize a weighted lever system to urge the sharpener toward the blade.

Figure 3:
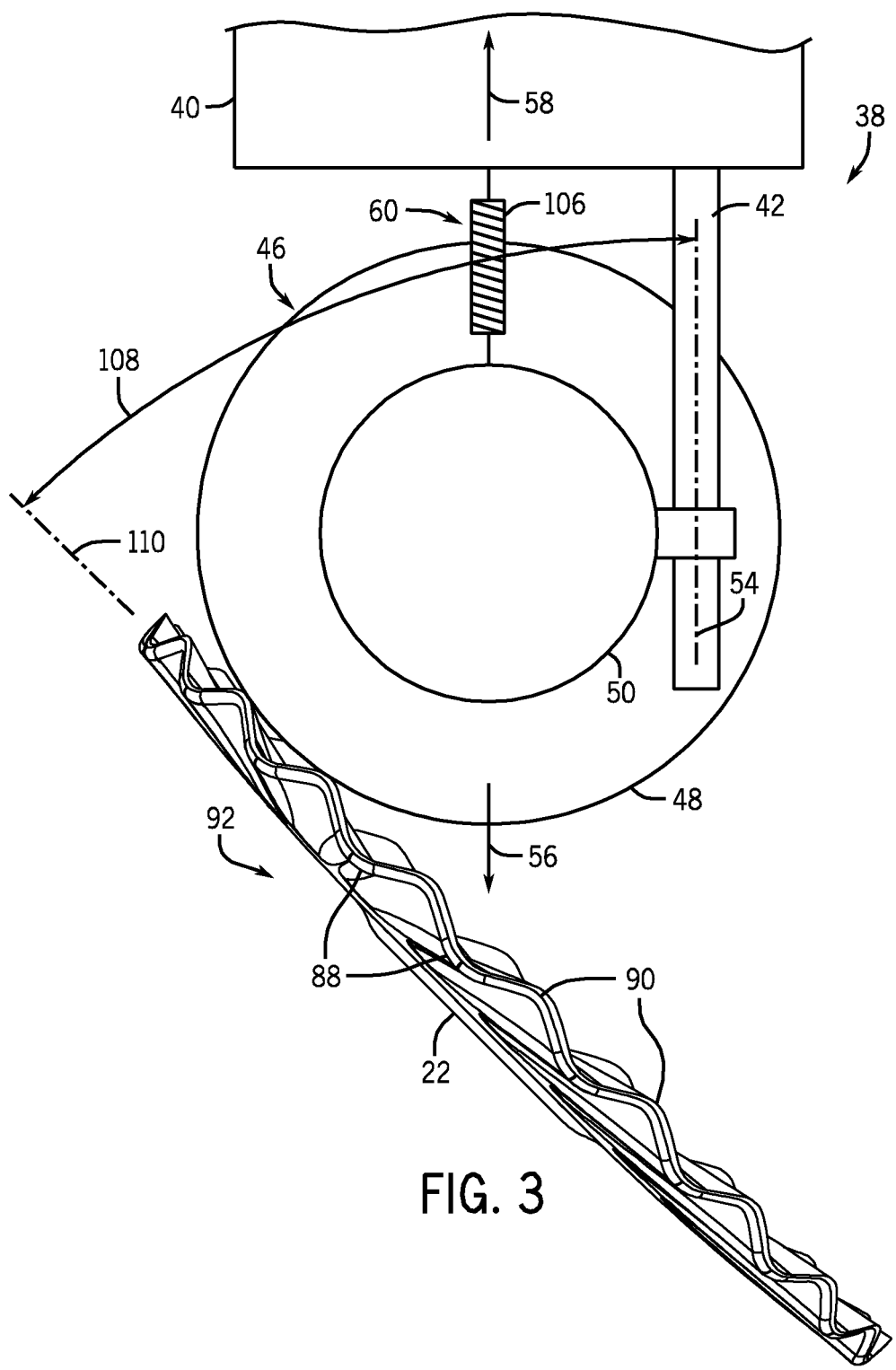
FIG. 3 is a top view of an alternative embodiment of a blade sharpening system that may be employed to sharpen blades of the agricultural implement.

FIG. 3 is a top view of an alternative embodiment of a blade sharpening system 38 that may be employed to sharpen blades 22 of the agricultural implement 10. As illustrated, the biasing assembly 60 includes a spring 106 configured to urge the sharpener 46 toward the blade 22. As will be appreciated, the spring 106 may be a coil spring, a leaf spring, or any other suitable spring configuration. The force of the spring 106 may be particularly configured to provide a desired contact force between the grinding disc 48 and the blade 22. Consequently, during operation of the blade sharpening system 38, the spring 106 induces the sharpener 46 to maintain contact with the blade 22 despite variations in the blade profile. For example, when the grinding disc 48 encounters a trough 90, the sharpener 46 moves in the direction 56, and when the grinding disc 48 encounters a crest 88, the sharpener 46 moves in the direction 58. In this manner, the illustrated blade sharpening system 38 will accommodate lateral variations in the blade profile, thereby providing a substantially uniform blade edge.

While the illustrated embodiment employs a spring 106 to urge the sharpener 46 toward the blade, it should be appreciated that alternative embodiments may include other biasing devices to provide the desired contact force between the grinding disc 48 and the blade 22. For example, certain embodiments may employ a hydraulic cylinder or a pneumatic cylinder to urge the grinding disc 48 into contact with the blade 22. In such embodiments, the fluid pressure within the cylinder may be particularly selected to establish the desired contact force.

As illustrated, the blade sharpening system 38 is angled relative to the blade 22. For example, an angle 108 between the rod 42 and a plane 110 of the fluted-concave disc blade 22 may be about 30 to about 60 degrees, about 40 to about 50 degrees, or about 45 degrees. By way of example, the angle 108 may be about 30, 35, 40, 45, 50, 55 or 60 degrees, or more.

The angle 108 may be particularly selected to achieve a desired bevel on the edge of the blade 22. In addition, the angled orientation of the blade sharpening system 38 may enable the grinding disc 48 to access the tight spaces (e.g., about 7.5 inches) between adjacent blades.

While the illustrated sharpener 46 is configured to sharpen a first side of each blade 22, it should be appreciated that the sharpener 46 may be configured to sharpen a second side of each blade 22. For example, the blade sharpening system 38 may be moved to the second side of the blade 22 via the movable platform 100. The grinding disc 48 may then be rotated into a desired orientation relative to the second side of the blade. In this manner, both sides (or either side) of each fluted-concave blade may be sharpened. In addition, it should be appreciated that the grinding disc 48 of the illustrated embodiment may be replaced with an alternative device, such as an edge roller, a polishing wheel or a wire wheel brush in alternative embodiments to sharpen the blades 22.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A blade sharpening system, comprising:
a base;
a rod extending from the base; and
a sharpener slidably coupled to the rod and configured to engage a generally circular blade of an agricultural implement while the generally circular blade is mounted on the agricultural implement, wherein the sharpener is configured to move along the rod to accommodate lateral variations in a profile of the generally circular blade; comprising a biasing assembly configured to urge the sharpener toward the generally circular blade; wherein the biasing assembly comprises:
a first gear rack coupled to the sharpener;
a first pinion gear engaged with the first gear rack;
a second pinion gear coupled to the first pinion gear; and
a second gear rack engaged with the second pinion gear, wherein a weight of the second gear rack urges the sharpener toward the generally circular blade via rotation of the first and second pinion gears.

2. The blade sharpening system of claim 1, wherein the biasing assembly comprises a spring.

3. The blade sharpening system of claim 1, wherein an angle between the rod and the generally circular blade is about 30 to about 60 degrees.

4. The blade sharpening system of claim 1, wherein the sharpener comprises a grinding disc configured to sharpen an edge of the generally circular blade, and a motor configured to drive the grinding disc in rotation.

5. The blade sharpening system of claim 1, wherein the sharpener is mounted in a substantially vertical orientation.

6. The blade sharpening system of claim 1, comprising a second rod coupled to the base, wherein the sharpener is slidably coupled to the first and second rods.

7. The blade sharpening system of claim 1, comprising a movable platform secured to the base, and configured to facilitate movement of the blade sharpening system relative to the agricultural implement.

8. The blade sharpening system of claim 7, comprising a height adjustment assembly extending between the movable platform and the base, wherein the height adjustment assembly is configured to adjust a height of the sharpener relative to the generally circular blade.

9. A blade sharpening system, comprising:
a base;
a rod extending from the base;
a sharpener slidably coupled to the rod and configured to engage a generally circular blade of an agricultural implement while the generally circular blade is mounted on the agricultural implement, wherein the sharpener is configured to move along the rod to accommodate lateral variations in a profile of the generally circular blade; and
a biasing assembly having a weight configured to urge the sharpener along the rod toward the generally circular blade via vertical movement of the weight.

10. The blade sharpening system of claim 9, wherein the biasing assembly comprises:
a first gear rack coupled to the sharpener;
a first pinion gear engaged with the first gear rack;
a second pinion gear coupled to the first pinion gear; and
a second gear rack having the weight, wherein the second gear rack is engaged with the second pinion gear, and the weight urges the sharpener toward the generally circular blade via rotation of the first and second pinion gears.

11. The blade sharpening system of claim 9, wherein an angle between the rod and the generally circular blade is about 30 to about 60 degrees.

12. The blade sharpening system of claim 9, wherein the sharpener comprises a grinding disc configured to sharpen an edge of the generally circular blade, and a motor configured to drive the grinding disc in rotation.

13. The blade sharpening system of claim 9, comprising a movable platform secured to the base, and configured to facilitate movement of the blade sharpening system relative to the agricultural implement.

14. A blade sharpening system, comprising:
a base;
a plurality of rods extending from the base;
a sharpener slidably coupled to the plurality of rod and configured to engage a generally circular blade of an agricultural implement while the generally circular blade is mounted on the agricultural implement, wherein the sharpener is configured to move along the plurality of rods to accommodate lateral variations in a profile of the generally circular blade; and
a biasing assembly configured to urge the sharpener along the plurality of rods toward the generally circular blade.

15. The blade sharpening system of claim 14, wherein the biasing assembly comprises:
a first gear rack coupled to the sharpener;
a first pinion gear engaged with the first gear rack;
a second pinion gear coupled to the first pinion gear; and
a second gear rack engaged with the second pinion gear, wherein a weight of the second gear rack urges the sharpener toward the generally circular blade via rotation of the first and second pinion gears.

16. The blade sharpening system of claim 14, wherein the sharpener comprises a grinding disc configured to sharpen an edge of the generally circular blade, and a motor configured to drive the grinding disc in rotation.

17. The blade sharpening system of claim 16, wherein the motor is mounted in a substantially vertical orientation, and the grinding disc is mounted in a substantially horizontal orientation.

18. The blade sharpening system of claim 14, comprising:
a movable platform secured to the base, and configured to facilitate movement of the blade sharpening system relative to the agricultural implement; and a height adjustment assembly extending between the movable platform and the base, wherein the height adjustment assembly is configured to adjust a height of the sharpener relative to the generally circular blade.

* * * * *